US012492653B2

(12) United States Patent
Beck et al.

(10) Patent No.: US 12,492,653 B2

(45) Date of Patent: Dec. 9, 2025

(54) MUFFLER AND METHOD FOR MAKING A MUFFLER

(71) Applicant: Purem GmbH, Neunkirchen (DE)

(72) Inventors: Thomas Beck, Aichwald (DE); Jürgen Häberle, Stuttgart (DE)

(73) Assignee: Purem GmbH, Neunkirchen (DE)

( * ) Notice: Subject to any disclaimer, the term of this patent is extended or adjusted under 35 U.S.C. 154(b) by 169 days.

(21) Appl. No.: 17/830,852

(22) Filed: Jun. 2, 2022

(65) Prior Publication Data

US 2022/0389848 A1 Dec. 8, 2022

(30) Foreign Application Priority Data

Jun. 2, 2021 (DE) ..................... 10 2021 114 254.7

(51) Int. Cl.

*F01N 1/00* (2006.01)

*G10K 11/16* (2006.01)

(52) U.S. Cl.

CPC ............ *F01N 1/003* (2013.01); *G10K 11/161* (2013.01)

(58) Field of Classification Search

CPC ........ F01N 1/003; F01N 13/082; F01N 13/08; F01N 13/1838; F01N 13/18; F01N 1/084; F01N 1/086; F01N 1/089; F01N 1/166; F01N 2470/02; F01N 2470/14; F01N 2470/16; F01N 2470/18; F01N 1/023; F01N 1/082; F01N 1/08; F01N 13/1844; F01N 13/185; F01N 13/1872; F01N 2450/20;

(Continued)

(56) References Cited

U.S. PATENT DOCUMENTS

2008/0196969 A1 8/2008 Henke et al.

2011/0024227 A1* 2/2011 Gorke ................ F01N 13/1838 181/212

(Continued)

FOREIGN PATENT DOCUMENTS

CN 102235222 A 11/2011

CN 106351712 B 1/2017

(Continued)

OTHER PUBLICATIONS

English translation of the first Chinese Office action dated Aug. 9, 2023 in corresponding Chinese patent application 202210616560.4.

*Primary Examiner* — Mark A Laurenzi

*Assistant Examiner* — Kelsey L Stanek

(74) *Attorney, Agent, or Firm* — Walter Ottesen, P.A.

(57) ABSTRACT

A muffler for an exhaust system of an internal combustion engine includes a muffler housing having a peripheral wall elongated along a longitudinal axis of the muffler housing. The peripheral wall has first and second end walls. A muffler insert is surrounded by the peripheral wall and is supported thereon. The muffler insert has a retaining wall extending in a direction of the longitudinal axis. The peripheral wall has a peripheral wall opening and a first exhaust-gas routing pipe has a first end region and is positioned with the first end region thereof engaging in the peripheral wall opening. The first exhaust-gas routing pipe has a second end region and is secured by the second end region thereof to the retaining wall. The first exhaust-gas routing pipe is of multi-part configuration and has a first pipe part and a second pipe part.

12 Claims, 4 Drawing Sheets

(58) Field of Classification Search
CPC ............ F01N 2490/155; G10K 11/161; Y10T 29/49398; Y10T 29/49934
USPC ........................................ 181/230, 212, 228
See application file for complete search history.

(56) References Cited

U.S. PATENT DOCUMENTS

| | | | |
|---|---|---|---|
| 2011/0272209 A1 | 11/2011 | Tauschek et al. | |
| 2015/0330283 A1* | 11/2015 | Carr | F01N 1/084 181/227 |

FOREIGN PATENT DOCUMENTS

| | | | | |
|---|---|---|---|---|
| DE | 10 2009 035 738 A1 | 2/2011 | | |
| DE | 102010014573 A1 * | 10/2011 | | F01N 1/02 |
| DE | 102010015322 A1 * | 10/2011 | | F01N 1/006 |
| EP | 1 888 891 B1 | 2/2008 | | |
| JP | 2003-113714 A | 4/2003 | | |

* cited by examiner

MUFFLER AND METHOD FOR MAKING A MUFFLER

CROSS REFERENCE TO RELATED APPLICATION

This application claims priority of German patent application no. 10 2021 114 254.7, filed Jun. 2, 2021, the entire content of which is incorporated herein by reference.

TECHNICAL FIELD

The present disclosure relates to a muffler for an exhaust system of an internal combustion engine, especially in a motor vehicle, and also to a method for making a muffler.

BACKGROUND

A muffler is known from US 2008/0196969 (the entire content of which is incorporated herein by reference). In this known muffler a muffler insert has been constructed with two partitions, arranged at a distance from one another in the direction of a longitudinal axis of a muffler housing, and accommodating a retaining wall between them. The muffler insert is surrounded by a peripheral wall, elongated in the direction of the longitudinal axis of the housing. A peripheral-wall opening formed in the peripheral wall has been positioned in such a manner that it is situated opposite a retaining-wall opening formed in the retaining wall. A one-piece exhaust-gas routing pipe, which provides an inlet pipe in this known muffler, is inserted into the muffler housing from outside through the peripheral-wall opening in such a manner that it has been positioned with a first end region of the pipe in the region of the peripheral wall and has been secured to the peripheral wall in this region by welding. A second end region of the exhaust-gas routing pipe has been positioned so as to engage in or penetrate the retaining-wall opening and has been connected to the retaining wall by positive closure generated by mechanical reshaping.

SUMMARY

An object of the present disclosure is to provide a muffler for an exhaust system of an internal combustion engine and a method for making a muffler, with which a structure that is easy to realize and yet stable is obtained.

According to a first aspect of the present disclosure, this object is achieved by a muffler for an exhaust system of an internal combustion engine. The muffler includes: a muffler housing defining a longitudinal axis (L) and having a peripheral wall elongated along the longitudinal axis (L); the peripheral wall having first and second end regions and first and second end walls at the first and second end regions, respectively; a muffler insert surrounded by the peripheral wall and supported thereon; the muffler insert having at least one retaining wall extending substantially in a direction of the longitudinal axis (L); the peripheral wall having a peripheral wall opening; at least one first exhaust-gas routing pipe having a first end region and being positioned with the first end region thereof engaging in the peripheral wall opening and being secured to the peripheral wall; the at least one first exhaust-gas routing pipe having a second end region and being secured by the second end region thereof to the at least one retaining wall; the at least one first exhaust-gas routing pipe having a first pipe part defining the first end region and positioned so as to engage in the peripheral wall opening and being secured to the peripheral wall; the at least one first exhaust-gas routing pipe having a second pipe part defining the second end region thereof secured to the at least one retaining wall; the first pipe part and the second pipe part having respective mutually adjoining longitudinal regions and having been pushed one into the other at the longitudinal regions thereof; the first pipe part and the second pipe part mutually overlapping in a longitudinal direction of the at least one first exhaust-gas routing pipe; and, the second pipe part being connected to the at least one retaining wall via material closure.

Since in the muffler according to the disclosure the at least one first exhaust-gas routing pipe has been constructed from several parts, there is the possibility of linking each of these parts to the system region, to be connected thereto, of the muffler, namely the peripheral wall, on the one hand, and a muffler insert, on the other hand, in a stable manner completely ruling out relative movements resulting in the generation of noises.

For a stable connection of the two pipe parts to one another, it is proposed that the first pipe part has been inserted into the second pipe part, and the first pipe part and the second pipe part have been connected to one another by radial widening of at least the first pipe part at least in its longitudinal region overlapping with the second pipe part, or that the second pipe part has been inserted into the first pipe part, and the first pipe part and the second pipe part have been connected to one another by radial widening of at least the second pipe part at least in its longitudinal region overlapping with the first pipe part. Irrespective of which of the pipe parts has been inserted into the other pipe part, the radial widening may also have been provided in such a way that both pipe parts are widened radially outward in their overlapping longitudinal regions and are consequently deformed, or/and that at least one of the pipe parts, in particular the first pipe part, is widened radially not only in its longitudinal region overlapping with the other pipe part but over its entire length.

In order to avoid the abutment of the second pipe part against a sharp-edged region of the at least one retaining wall, it is proposed that a retaining-wall opening—surrounded, at least in some regions, by a bent fastening-edge region of the at least one retaining wall—has been provided in the at least one retaining wall, assigned to the at least one first exhaust-gas routing pipe, and that the second pipe part of the at least one first exhaust-gas routing pipe has been positioned so as to engage in the retaining-wall opening and has been connected to the at least one retaining wall in the region of the fastening-edge region by material closure.

For a gas-tight seal of the muffler housing, the first pipe part may have been connected to the peripheral wall by welding. For a stable and, in particular, also heat-resistant structure, the material closure between the second pipe part and the retaining wall can also be obtained by the second pipe part having been connected to the at least one retaining wall by welding.

The muffler insert may further include at least two partitions arranged so as to be substantially orthogonal to the longitudinal axis of the housing and supported on the peripheral wall, the at least one retaining wall being secured, in each of two opposite end regions thereof, to one of the partitions.

For the purpose of conducting exhaust gas in the muffler, the muffler insert may further include at least one second exhaust-gas routing pipe, a partition opening being provided in at least one of the partitions connected to the at least one retaining wall, assigned to the at least one second exhaust-gas routing pipe, and a front-wall opening being provided in one of the end walls, the at least one second exhaust-gas routing pipe having been positioned so as to engage in the partition opening and in the front-wall opening and being secured in the region of the front-wall opening to the end wall exhibiting the opening, or/and being secured in the region of at least one partition opening to the partition exhibiting the opening by material closure, for instance by welding.

The at least one second exhaust-gas routing pipe may be an outlet pipe. Furthermore, two second exhaust-gas routing pipes may have been provided, a front-wall opening having been provided in each end wall, assigned to one of the second exhaust-gas routing pipes.

In a configuration that is advantageous, in particular, for integration into a vehicle as a transverse muffler, the at least one first exhaust-gas routing pipe may be an inlet pipe.

According to a further aspect, the aforementioned object is achieved by a method for making an exhaust muffler, in particular a muffler constructed in accordance with the disclosure. The method includes the method steps of:

a) providing at least one muffler insert with at least one retaining wall and with at least one retaining-wall opening in the at least one retaining wall,
b) providing at least one multi-part first exhaust-gas routing pipe with a first pipe part and with a second pipe part,
c) arranging the second pipe part of the at least one first exhaust-gas routing pipe in such a manner that the latter is positioned so as to engage in a retaining-wall opening of the at least one retaining wall of the at least one muffler insert,
d) securing the second pipe part of the at least one first exhaust-gas routing pipe to the at least one retaining wall by material closure,
e) surrounding the at least one muffler insert and the second pipe part, secured to the at least one muffler insert, of the at least one first exhaust-gas routing pipe by a peripheral wall of a muffler housing, a peripheral-wall opening having been provided in the peripheral wall, assigned to the at least one first exhaust-gas routing pipe,
f) arranging the first pipe part of the at least one first exhaust-gas routing pipe in such a manner that the latter is positioned so as to engage in the peripheral-wall opening provided, assigned to the at least one exhaust-gas routing pipe, and that the first pipe part and the second pipe part, secured to the at least one retaining wall of the at least one muffler insert, of the at least one first exhaust-gas routing pipe are inserted into one another and overlap in a longitudinal direction of the at least one first exhaust-gas routing pipe,
g) connecting the first pipe part to the second pipe part of the at least one first exhaust-gas routing pipe by radial widening of the first pipe part or/and of the second pipe part at least in their overlapping longitudinal regions.

In the course of step a), the at least one retaining wall can be provided in such a manner that a bent fastening-edge region, surrounding the retaining-wall opening at least in some regions, of the at least one retaining wall is formed, assigned to the at least one retaining-wall opening, and in the course of step d) the second pipe part of the at least one first exhaust-gas routing pipe can be secured to the at least one retaining wall in the region of the fastening-edge region. Consequently a two-dimensional contact between the retaining wall and the second pipe part is guaranteed which, moreover, enables an easy-to-realize connection by material closure.

For a stable and heat-resistant and exhaust-gas-resistant structure, this material closure can be obtained by the second pipe part of the at least one first exhaust-gas routing pipe being secured to the at least one retaining wall by welding in the course of step d).

In the course of step f), the first pipe part can be inserted into the second pipe part, and in the course of step g) the first pipe part and the second pipe part can be connected to one another by radial widening of at least the first pipe part at least in its longitudinal region overlapping with the second pipe part. In an alternative procedure, in the course of step f) the second pipe part can be inserted into the first pipe part, and in the course of step g) the first pipe part and the second pipe part can be connected to one another by radial widening of at least the second pipe part at least in its longitudinal region overlapping with the first pipe part.

For the integration of the at least one retaining wall into the muffler, in the course of step a) the at least one muffler insert can be provided in such a manner that the at least one retaining wall is connected, in each of two opposite end regions thereof, to a partition. Such partitions may subdivide an interior space of the muffler into several chambers, optionally communicating with one another via openings, and may be utilized simultaneously for the purpose of linking the muffler insert to the peripheral wall.

In order to obtain a defined routing of exhaust gas in the interior of the muffler, it is proposed that in the course of step a) the at least one muffler insert is provided in such a manner that at least one second exhaust-gas routing pipe engages in a partition opening on each of the partitions connected to the at least one retaining wall, and extends with a coupling portion beyond one of the partitions.

In the course of step e), the at least one muffler insert can be surrounded by the peripheral wall by winding a plate-like peripheral-wall blank around the at least one muffler insert. In this case, the peripheral-wall blank may already have a preformed structure adapted to the ring-like structure of the peripheral wall, which is then wound around the at least one muffler insert or positioned surrounding it. In an alternative procedure, in the course of step e) the at least one muffler insert can be surrounded by providing the peripheral wall with a structure that is closed in the peripheral direction and by inserting the at least one muffler insert into the peripheral wall provided with a structure that is closed in the peripheral direction. In this case too, a plate-like peripheral-wall blank can firstly be brought into a tube-like shape, closed in the peripheral direction, and then, in the region of its peripheral ends situated opposite one another or overlapping one another in the peripheral direction, can be connected for the purpose of providing the closed structure, for instance by positive closure or/and material closure.

Furthermore, for the purpose of providing a completely sealed muffler housing, a step h) may have been provided for securing an end wall to each of the axial end regions of the peripheral wall, elongated in the direction of a longitudinal axis of the housing, by material closure or/and positive closure. It should be pointed out that step h) is carried out in each case after the surrounding of the at least one muffler insert by the peripheral wall. However, step h) may be carried out in connection with one or both end walls before or after the arranging of the first pipe part of the at least one first exhaust-gas routing pipe on the peripheral wall or on the assigned second pipe part.

In the course of step h), at least one of the end walls can be secured to the peripheral wall in such a manner that a front-wall opening provided in this end wall is positioned in such a way that the coupling portion of a second exhaust-gas routing pipe is positioned so as to engage in the front-wall opening. In the region of such a second exhaust-gas routing pipe, positioned so as to engage in or penetrate a front-wall opening, an exhaust-gas-tight seal can be obtained by a material closure—generated, for instance, by welding—being produced between such a second exhaust-gas routing pipe and the assigned end wall. The disclosure further relates to an exhaust system for an internal combustion engine, including at least one muffler constructed in accordance with the disclosure, which can preferentially have been produced by a method according to the disclosure.

BRIEF DESCRIPTION OF THE DRAWINGS

The invention will now be described with reference to the drawings wherein.

DESCRIPTION OF THE PREFERRED EMBODIMENTS

Figure 1:
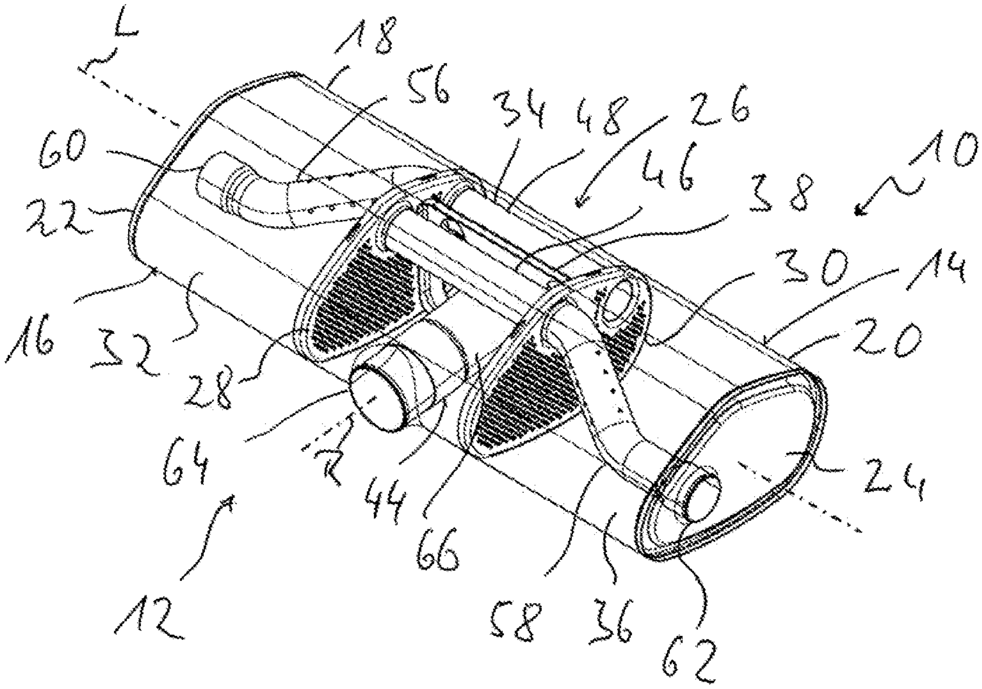
FIG. 1 shows a perspective view of a muffler, wherein a muffler housing of the muffler is represented in transparent manner.

In FIG. 1, a muffler integrated within a vehicle—for example, as a transverse muffler in an exhaust system 10 of an internal combustion engine—is designated generally by 12. The muffler 12 includes a muffler housing 14, elongated in the direction of a longitudinal axis L of the housing, with a peripheral wall 16 surrounding the longitudinal axis L of the housing. End walls 22, 24 have been secured to the peripheral wall 16 on both axial end regions 18, 20 thereof. The peripheral wall 16 and the end walls 22, 24 have been provided as sheet-metal formed parts.

Figure 2:
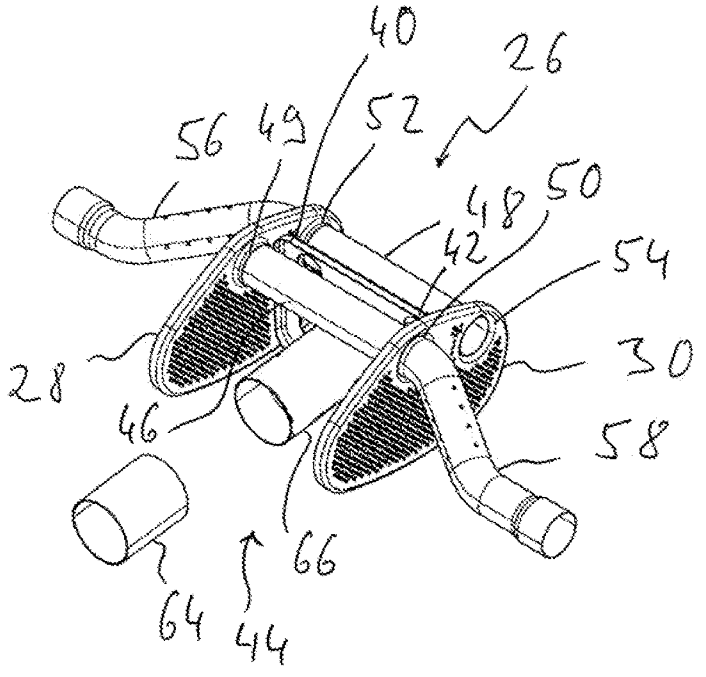
FIG. 2 shows a muffler insert of the muffler of FIG. 1 in conjunction with an exhaust-gas routing pipe of bipartite configuration.

A muffler insert, designated generally by 26, has been provided in the interior of the muffler housing 14. In the embodiment represented, the insert includes two partitions 28, 30, also shown in FIG. 2, which subdivide the interior space of the muffler housing into three chambers 32, 34, 36 succeeding one another in the direction of the longitudinal axis L of the housing. In this connection, openings may have been provided in the partitions 28, 30, via which the chambers 32, 34, 36 can communicate with one another.

The muffler insert further includes a retaining wall 38 extending substantially in the direction of the longitudinal axis L of the housing and oriented substantially so as to be orthogonal to the two partitions 28, 30. In its two axial end regions 40, 42 the retaining wall 38 has been firmly connected to the two partitions 28, 30, for instance by welding.

In the case of the muffler 12 shown in FIG. 1, a first exhaust-gas routing pipe 44 of bipartite configuration, elucidated in more detail below and providing an inlet pipe, has furthermore been provided, through which exhaust gas is conducted into chamber 34 in the muffler housing 14. In order to discharge the exhaust gas from the muffler housing 14, two second exhaust-gas routing pipes 46, 48, each providing an outlet pipe, have been provided. A partition opening 49, 50 and 52, 54, respectively, has been provided in each of the two partitions 28, 30, assigned to each second exhaust-gas routing pipe 46, 48. Each of the partition openings 49, 50, 52, 54 may have been surrounded by a bent fastening-edge region formed on the respective partition 28, 30, into which the respective second exhaust-gas routing pipe 46, 48 has been inserted. Advantageously, in the region of each such fastening-edge region or each partition opening 49, 50, 52, 54 the respective second exhaust-gas routing pipe 46, 48 may have been firmly connected to the respective partition 28, 30 by material closure, in particular for welding. A circumferential weld seam may have been provided here, or individual welding spots may have been provided for the purpose of obtaining the firm connection.

Each of the second exhaust-gas routing pipes 46, 48 extends beyond one of the partitions 28, 30 with a coupling portion 56, 58. An end-wall opening 60 has been provided, assigned to the coupling or connecting portion 56, in the end wall 22 arranged on the axial end region 18 of the peripheral wall 16, into which the coupling portion 56 of second exhaust-gas routing pipe 48 has been positioned in engaging manner. Also in the region of this end-wall opening 60, an outwardly bent-over fastening-edge region, for instance, may have been provided on the end wall 22. The coupling portion 56 may have been connected to the end wall 22 in the region of this fastening-edge region by a preferentially circumferential weld seam. Equally, an end-wall opening 62 surrounded by an outwardly bent-over fastening-edge region has been formed on the end wall 24 provided on the axial end region 20 of the peripheral wall 16, into which the coupling portion 58 of second exhaust-gas routing pipe 46 has been positioned in engaging manner. Here too, a completely circumferential welded joint may have been formed for a gas-tight seal between the coupling portion 58 and the end wall 24.

In the muffler insert 26 including the two partitions 28, 30, the retaining wall 38 and the two second exhaust-gas routing pipes 46, 48, second exhaust-gas routing pipe 46 is open to chamber 32 in the region of its linkage to partition 28 and is open to chamber 36 in the region of its coupling portion 58 via several openings provided therein. Equally, second exhaust-gas routing pipe 48 is open to chamber 36 in the region of its coupling to partition 30 and is open to chamber 32 in the region of its coupling portion 56 via several openings provided therein. The exhaust gas introduced into chamber 34 via the first exhaust-gas routing pipe 44 can be emitted from chamber 34 into chambers 32, 36 through the openings provided in the partitions 28, 30, and, via these chambers, can be emitted from the muffler housing 14 through the two second exhaust-gas routing pipes 46, 48, for instance into tailpipes adjoining the muffler 12, which may adjoin the coupling portions 56, 58 of the two second exhaust-gas routing pipes 46, 48 in the region of the end walls 22, 24.

In the following, it will be described how the muffler represented in FIG. 1 can be produced, in particular how the first exhaust-gas routing pipe 44 of bipartite construction, with its first pipe part 64 and its second pipe part 66, can be integrated into the muffler 12.

Firstly, the muffler insert 26 is provided with the two partitions 28, 30, with the retaining wall 38 and with the second exhaust-gas routing pipes 46, 48. In this regard, before or after the connecting of the retaining wall 38 to the two partitions 28, 30, the second pipe part 66 of the first exhaust-gas routing pipe 44 can be connected to the retaining wall 38 by material closure. For the connection to the second pipe part 66 of the first exhaust-gas routing pipe 44, the retaining wall 38 may exhibit a retaining-wall opening 68 which is surrounded by a fastening-edge region 70 provided on the retaining wall 38 by forming of the latter by a pull-through, for instance. The second pipe part 66 is inserted into the retaining-wall opening 68 with an end portion providing a second end region 72 of the first exhaust-gas routing pipe 44, so that, for instance, it lies flush with an end wall of the fastening-edge region 70 or protrudes slightly beyond it. A firm connection between the second pipe part 66 and the retaining wall 38 is generated by welding—for instance, by a circumferential weld seam—in the region where the second end region 72 of the pipe adjoins the fastening-edge region 70, or by several welding spots succeeding one another in the peripheral direction. In the second end region 72 the first exhaust-gas routing pipe 44 is open to chamber 34.

After the muffler insert 26, which has already been assembled with the second pipe part 66, has been constructed, the muffler insert 26 is surrounded by the peripheral wall 16. This can be done, for instance, by the peripheral wall 16 being wound around the muffler insert 26. In this case, the peripheral wall 16 may be provided as a plate-like sheet-metal blank in which a peripheral-wall opening 74 for the first exhaust-gas routing pipe 44, or for the first pipe part 64 thereof, for instance in the form of an outwardly directed pull-through, has already been provided with a fastening-edge region 76. The peripheral-wall blank may be pre-bent already prior to being connected to the muffler insert 26, so that it can be positioned surrounding the muffler insert 26. In this state, axially bent-over edge regions of the partitions 28, 30 abut the inner peripheral surface of the peripheral wall 16. In its two end regions situated in the peripheral direction, the peripheral wall 16 is provided as a closed, ring-like structure by material closure—that is, for instance, by a weld seam—or/and by positive closure, for instance by flanging. The muffler insert 26 is held in place in defined manner in this ring-like structure. In addition, there is the possibility of generating a firm connection between one or both of the partitions 28, 30 and the peripheral wall 16 by welding. In an alternative procedure, a plate-like peripheral-wall blank, for instance, can firstly be bent into a tube-like structure, closed in the peripheral direction, and connected in its opposing or overlapping peripheral end regions by material closure—for instance, welding—or/and positive closure—for instance, flanging. The muffler insert 26 can then be inserted into the structure, closed in the peripheral direction, of the peripheral wall 16 and arranged in a position designated for its incorporation. In this position the second pipe part 66, already supported on the muffler insert 26, has been positioned in such a way that it is situated opposite the peripheral-wall opening 74 provided in the peripheral wall 16. Also with this procedure, the muffler insert 26 may be held in the peripheral wall 16 by clamping—that is, substantially frictional interaction. In addition, there is the possibility of establishing a firm connection between the muffler insert 26 and the peripheral wall 16 by material closure, for instance welding.

Figure 3:
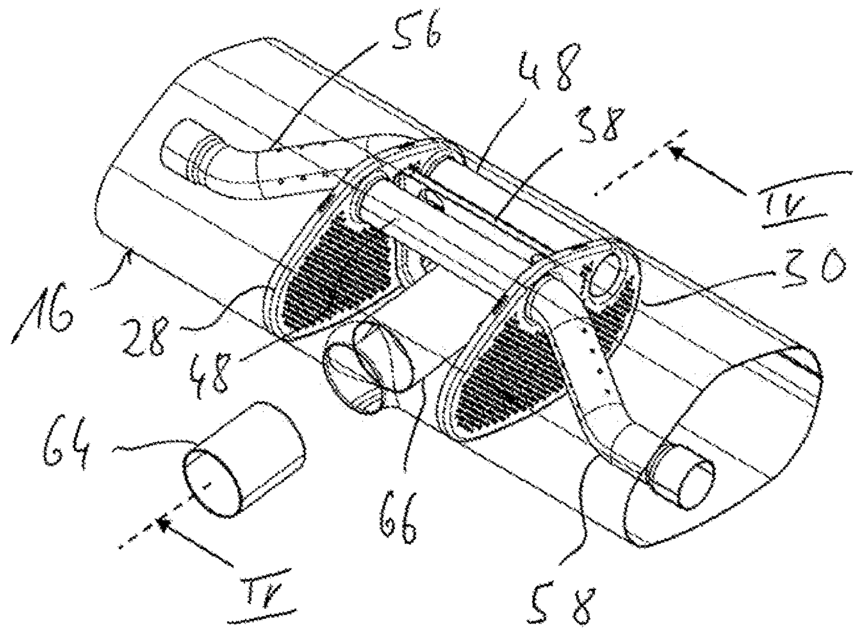
FIG. 3 shows a phase of an operation for producing the muffler shown in FIG. 1, wherein the muffler insert, connected to a second pipe part of the exhaust-gas routing pipe, has been wrapped with a peripheral wall.
Figure 4:
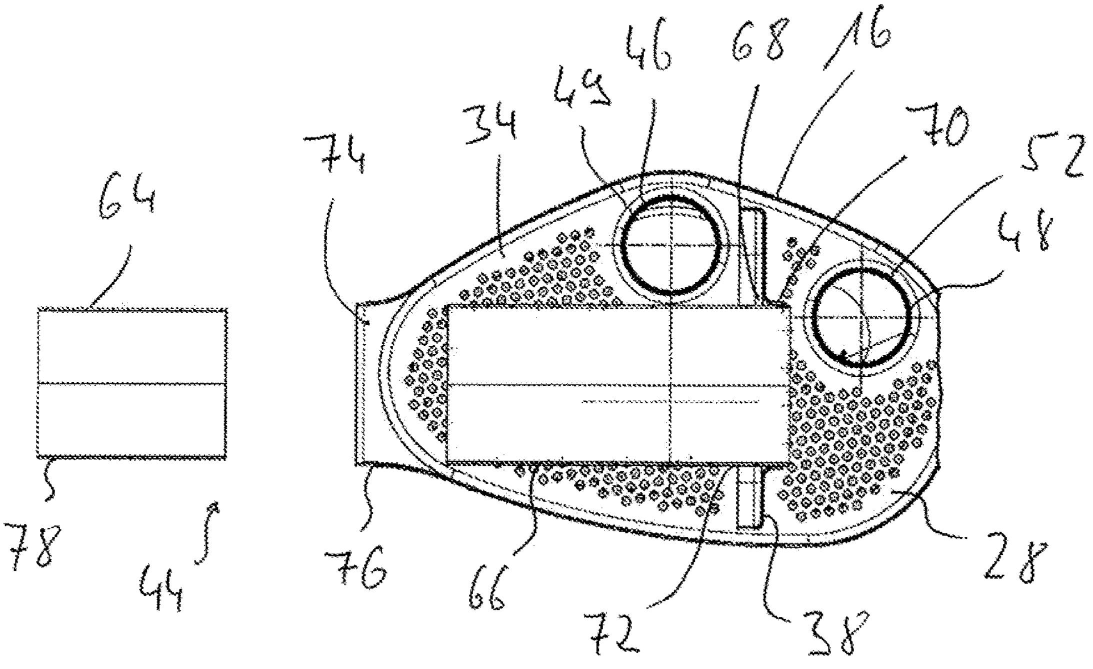
FIG. 4 shows a cross-sectional view of the muffler in the production phase shown in FIG. 3, cut along a line IV-IV in FIG. 3.

The state represented in FIG. 3 then obtains, in which initially the first pipe part 64 of the first exhaust-gas routing pipe 44 has not yet been integrated into the muffler, and the end walls 22, 24 have not yet been provided on the two axial end regions 18, 20 of the peripheral wall 16. The operations for integrating the first pipe part 64 into the muffler, on the one hand, and for attaching the end walls 22, 24 to the peripheral wall 16, on the other hand, can be carried out in any sequence, since they are basically independent of one another. For instance, the first pipe part 64 may firstly be provided on the muffler before the end walls 22, 24 are attached to the peripheral wall 16. Alternatively, the two end walls 22, 24 may firstly be attached to the peripheral wall 16 before the first pipe part 64 is integrated into the muffler.

Figure 5:
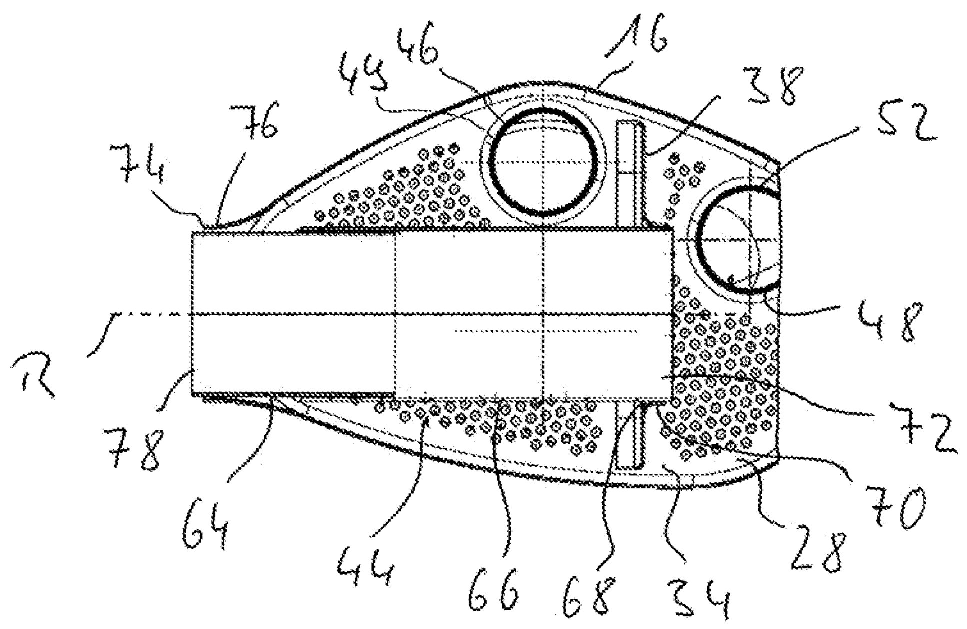
FIG. 5 shows a view corresponding to FIG. 4 after the insertion of a first pipe part into a second pipe part, secured to the muffler insert, through a peripheral wall.

For the purpose of integrating the first pipe part 64 into the muffler, the first pipe part 64 is pushed through the peripheral-wall opening 74. The first pipe part 64, can preferentially be provided with a cylindrical structure, has a smaller cross-sectional dimension than the second pipe part 66, likewise can preferentially be provided with a cylindrical structure. Consequently, the first pipe part 64 can be pushed so far through the peripheral-wall opening 74 that it is inserted into the second pipe part 66 and overlaps with the latter, in some regions, in a longitudinal direction of the first exhaust-gas routing pipe 44, oriented substantially in the direction of a longitudinal axis R of the pipe. In this state represented in FIG. 5, a first end region 78 of the first exhaust-gas routing pipe 44, provided by the first pipe part 64, may terminate substantially flush with the fastening-edge region 76 in the region of the peripheral-wall opening 74 or may protrude slightly outward beyond it. As can be discerned in FIG. 5, in this regard the dimensioning of the first pipe part 64 may have been matched to the dimensioning of the peripheral-wall opening 74 in such a manner that a slight gap remains between the fastening-edge region 76 and the first pipe part 64.

Figure 6:
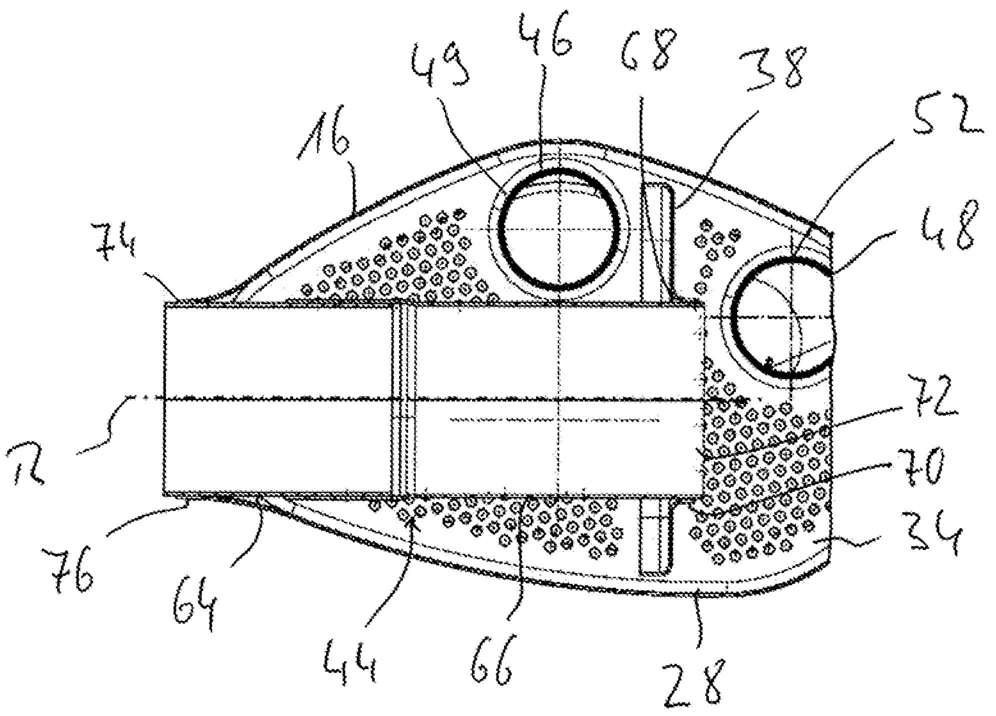
FIG. 6 shows a representation corresponding to FIG. 5 after the radial widening of the pipe parts inserted into one another.

In a subsequent working step, the first pipe part 64 is spread apart radially, preferentially in the region of its entire axial length, by a spreading tool. As a result, the first pipe part 64 is pressed radially outward against the fastening-edge region 76, and consequently a defined positioning of the first pipe part 64 with respect to the peripheral wall 16 is also obtained. Moreover, the first pipe part 64 is spread apart radially outward in its longitudinal region overlapping with the second pipe part 66, this spreading, for providing a stable connection between the two pipe parts 64, 66, preferentially being effected to such an extent that, as can be discerned in FIG. 6, the second pipe part 66 is also slightly spread apart radially outward in its longitudinal region overlapping the first pipe part 64. After this spreading operation has been carried out, the second pipe part 66 consequently exhibits two longitudinal regions, in themselves substantially cylindrical, with cross-sectional dimensions differing from one another.

In order to obtain a gas-tight coupling of the first pipe part 64 to the peripheral wall 16 in the region of the first end region 78 of the pipe, a completely circumferential weld seam can be generated which links the fastening-edge region 76 to the first pipe part 64. In the course of this operation, a further exhaust-gas routing pipe 44, adjacent to the first exhaust-gas routing pipe 44, which can be inserted into the first pipe part 64 from outside can, for instance, be linked to the peripheral wall 16 and also to the first pipe part 64, so that three parts can be connected to one another with a single weld seam. Alternatively, after the weld seam connecting the first pipe part 64 to the peripheral wall 16 has been generated, such a further exhaust-gas routing pipe can also be linked to the muffler 12 by a further weld seam preferentially completely encircling the longitudinal axis R of the pipe.

Figure 7:
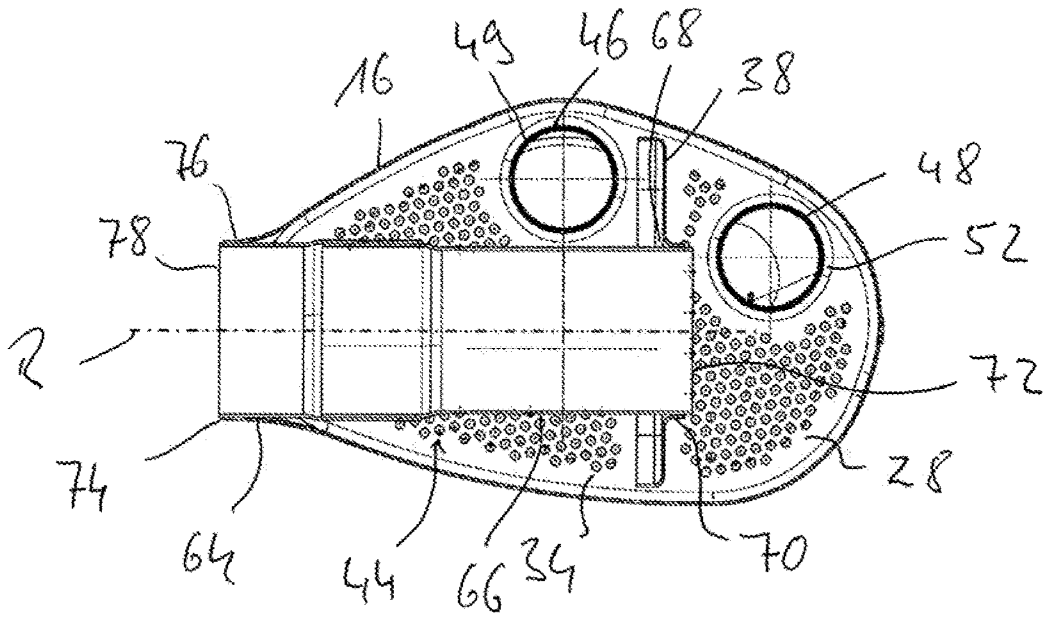
FIG. 7 shows a representation corresponding to FIG. 6 in the case of an alternative procedure; and, FIG. 8 shows the muffler in the production phase shown in FIGS. 5 to 7 with the muffler insert surrounded by the peripheral wall and with the first pipe part inserted into the second pipe part secured to the muffler insert by material closure.

An alternative procedure for integrating the first pipe part 64 into the muffler is illustrated in FIG. 7. In this configuration, the first pipe part 64 exhibits a larger cross-sectional dimension than the second pipe part 66, at least in its longitudinal region to be positioned overlapping with the second pipe part 66. For instance, initially both pipe parts 64, 66 may have a cylindrical structure— that is, a constant cross-sectional contour and cross-sectional dimension over the entire length thereof.

Figure 8:
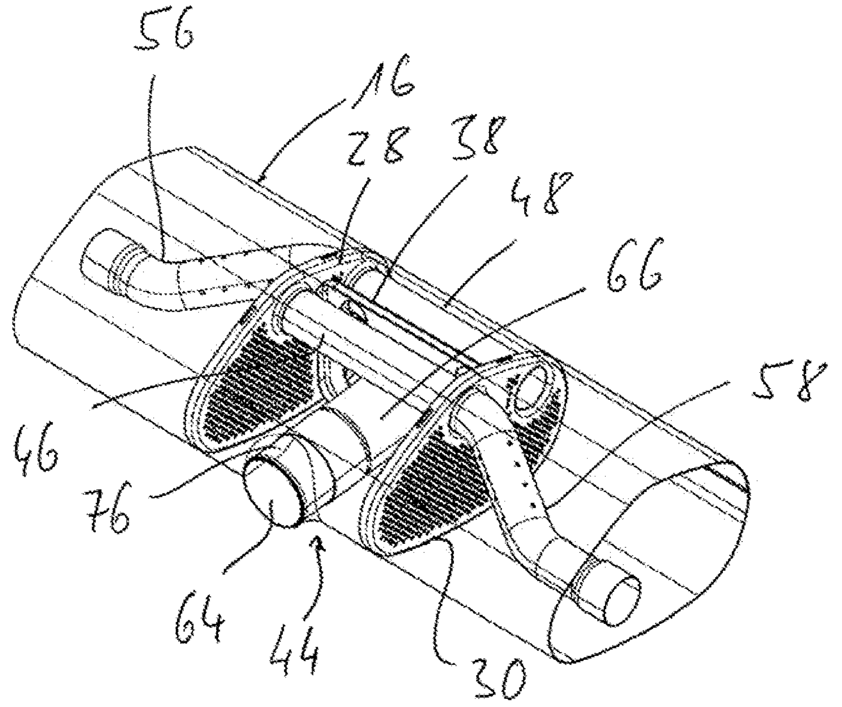

In the course of passing through the peripheral-wall opening 74, the first pipe part 64 is pushed over the second pipe part 66, already surrounded by the peripheral wall 16, so that these parts overlap, in some regions, in the direction of the longitudinal axis R of the pipe or in the longitudinal direction of the first exhaust-gas routing pipe 44. Subsequently a spreading operation is carried out, in which the two pipe parts 64, 66 are spread apart radially at least in their overlapping longitudinal regions, and optionally the first pipe part is also spread apart in its remaining longitudinal region, in particular in the longitudinal region situated in the peripheral-wall opening 74. Also by this means, a firm connection can be generated between the two pipe parts 64, 66, and subsequently the first pipe part 64 can be connected in stable and gas-tight manner to the peripheral wall 16 in the region of the fastening-edge region 76 with a weld seam preferentially completely encircling the longitudinal axis R of the pipe. If the first exhaust-gas routing pipe 44 is firstly integrated into the muffler, the state represented in FIG. 8 is obtained, in which no end walls have yet been provided on the two axial end regions 18, 20 of the peripheral wall 16. These end walls can then be brought close up to the axial end regions 18, 20 and firmly connected to the peripheral wall 16 in completely circumferential manner, for instance by welding or/and by flanging or such like, for the purpose of generating a gas-tight seal in the peripheral direction. When the two end walls 22, 24 are being brought close up to the peripheral wall 16, they are pushed with their end-wall openings 60, 62, or with the fastening-edge regions preferentially formed thereon, over the ends, situated in the region of the axial end regions 18, 20, of the coupling portions 56, 58 of the second exhaust-gas routing pipes 46, 48, so that a gas-tight coupling of the second exhaust-gas routing pipes 46, 48 to the end walls 22, 24 is obtained in these regions by preferentially completely circumferential weld seams.

With the structure, described in the foregoing, of a muffler, and with the procedure, described in the foregoing, for producing such a muffler, it becomes possible to provide a muffler that, with a structure that is easy to realize, enables a stable linkage—produced, in particular, by material closure—of the first exhaust-gas routing pipe—acting, for instance, as an inlet pipe—to a muffler insert. In the region where the first exhaust-gas routing pipe adjoins the retaining wall of the muffler insert, consequently no relative movements can arise that might result in rattling noises or impact noises. Since the two pipe parts of the first exhaust-gas routing pipe, connected to one another merely by radial spreading, overlap one another in a comparatively large longitudinal region of the pipe and have been pressed against one another by being spread apart, there is no risk of relative movements and of the generating of rattling noises in this overlapping region.

Finally, it should be pointed out that in various detailed aspects the muffler may, of course, be implemented otherwise than as set forth above. For instance, the second exhaust-gas routing pipes may exhibit a different contour or may have been integrated into the muffler in a different manner. Also, the number of second exhaust-gas routing pipes might differ from the number represented. The muffler might also exhibit more than one first exhaust-gas routing pipe, and the direction of flow through the muffler might be different, so that the first exhaust-gas routing pipe(s) might act as outlet pipes. The number of partitions in the muffler or on the muffler insert might also differ from the number represented, and several such muffler inserts interacting with a first exhaust-gas routing pipe might have been provided in succession in the direction of the axis of the muffler housing, and surrounded by a common peripheral wall.

It is understood that the foregoing description is that of the preferred embodiments of the invention and that various changes and modifications may be made thereto without departing from the spirit and scope of the invention as defined in the appended claims.

What is claimed is:

1. A muffler for an exhaust system of an internal combustion engine, the muffler comprising:

a muffler housing defining a longitudinal axis (L) and having a peripheral wall elongated along said longitudinal axis (L);

said peripheral wall having first and second end regions and first and second end walls at said first and second end regions, respectively;

a muffler insert surrounded by said peripheral wall and supported thereon;

said muffler insert having at least one retaining wall extending substantially in a direction of said longitudinal axis (L);

said retaining wall having a retaining-wall opening surrounded by a bent retaining-wall fastening-edge region;

said peripheral wall having a peripheral-wall opening surrounded by a peripheral-wall fastening-edge region;

at least one first exhaust-gas routing pipe having a first end region and being positioned with said first end region thereof engaging in said peripheral-wall opening and being secured to said peripheral wall in the region of said peripheral-wall fastening-edge region by welding;

said at least one first exhaust-gas routing pipe having a second end region and being positioned with said second end region thereof engaging in said retaining-wall opening and being secured to said at least one retaining wall in the region of said retaining-wall fastening-edge region by welding;

said at least one first exhaust-gas routing pipe having a first pipe part defining said first end region and being positioned so as to engage in said peripheral-wall opening and being secured to said peripheral wall in the region of said retaining-wall fastening-edge region by welding;

said at least one first exhaust-gas routing pipe having a second pipe part defining said second end region and being positioned so as to engage in said retaining-wall opening and being secured to said at least one retaining wall in the region of said retaining-wall fastening-edge region by welding;

said first pipe part and said second pipe part having respective mutually adjoining longitudinal regions and being pushed one into the other at said longitudinal regions thereof for providing a pipe-part overlapping region by mutually overlapping each other in a longitudinal direction of said at least one first exhaust-gas routing pipe, said pipe-part overlapping region being positioned at an axial distance to said peripheral-wall fastening-edge region and the said retaining-wall fastening-edge region, such that said first pipe part does not engage into said retaining-wall opening and does not axially overlap said retaining-wall fastening-edge region and said second pipe part does not engage into said peripheral-wall opening and does not axially overlap said peripheral-wall fastening-edge region; and;

wherein one of the following applies:

a) said first pipe part being inserted into said second pipe part and said first pipe part and said second pipe part being mutually connected by radial widening of said first pipe part and said second pipe part in said pipe-part overlapping region; or, b) said second pipe part being inserted into said first pipe part and said first pipe part and said second pipe part being mutually connected by radial widening of said second pipe part and said first pipe part in said pipe-part overlapping region.

2. The muffler of claim 1, wherein said muffler insert includes at least two partitions arranged so as to be substantially orthogonal to said longitudinal axis (L) and supported on said peripheral wall; and, said at least one retaining wall has first and second opposite end regions and is secured to one of said partitions at one of said first and second opposite end regions and is secured to an other one of said partitions at the other one of said first and second opposite end regions.

3. The muffler of claim 2, wherein said muffler insert includes at least one second exhaust-gas routing pipe; in association with at least one second exhaust-gas routing pipe of the at least one exhaust-gas routing pipe, a partition opening is provided in at least one of said partitions connected to said at least one retaining wall; in association with each second exhaust-gas routing pipe of said at least one exhaust-gas routing pipe, an end wall opening is provided in one of said end walls; and, said at least one second exhaust-gas routing pipe is positioned so as to engage in said partition opening and in said end wall opening and is secured by material closure in at least one of the following:

a) in a region of said end wall opening to said end wall; and, b) in a region of at least one partition opening to said partition having said opening.

4. The muffler of claim 3, wherein at least one of the following applies:

a) said at least one second exhaust-gas routing pipe is an outlet pipe; and, b) said muffler comprises two second exhaust-gas routing pipes; and, each end wall has respective end wall openings formed therein for accommodating a corresponding one of said two second exhaust-gas routing pipes.

5. The muffler of claim 1, wherein said at least one first exhaust-gas routing pipes is an inlet pipe.

6. A method for making an exhaust muffler, comprising the steps of:

a) providing at least one muffler insert with at least one retaining wall and with at least one retaining-wall opening in the at least one retaining wall, wherein a bent retaining-wall fastening-edge region surrounding the retaining-wall opening is formed, assigned to the at least one retaining-wall opening;

b) providing at least one multi-part first exhaust-gas routing pipe with a first pipe part and with a second pipe part;

c) arranging the second pipe part of the at least one first exhaust-gas routing pipe so as to cause said at least one first exhaust-gas routing pipe to be positioned to engage in a retaining-wall opening of the at least one retaining wall of the at least one muffler insert with an end portion thereof providing a second end region of said at least one first exhaust-gas routing pipe;

d) securing the second pipe part of the at least one first exhaust-gas routing pipe to the at least one retaining wall in the region of the retaining-wall fastening-edge region by welding;

e) surrounding the at least one muffler insert and the second pipe part, secured to the at least one muffler insert, of the at least one first exhaust-gas routing pipe by a peripheral wall of a muffler housing, a peripheral-wall opening being provided in the peripheral wall, assigned to the at least one first exhaust-gas routing pipe, wherein a peripheral-wall fastening-edge region surrounding the peripheral-wall opening is formed, assigned to the peripheral-wall opening;

f) arranging the first pipe part of the at least one first exhaust-gas routing pipe such as to engage in the peripheral-wall opening with an end portion thereof providing a first end region of said at least one first exhaust-gas routing pipe and such that the first pipe part and the second pipe part of the at least one first exhaust-gas routing pipe are inserted into one another and overlap each other in a longitudinal direction of the at least one first exhaust-gas routing pipe in a pipe-part overlapping region, said pipe-part overlapping region being positioned at an axial distance to said peripheral-wall fastening-edge region and said retaining-wall fastening-edge region, such that said first pipe part does not engage into said retaining-wall opening and does not axially overlap said retaining-wall fastening-edge region and said second pipe part does not engage into said peripheral-wall opening and does not axially overlap said peripheral-wall fastening-edge region; and, g) connecting the first pipe part to the second pipe part of the at least one first exhaust-gas routing pipe by radial widening of the first pipe part and radial widening of the second pipe part in said pipe-part overlapping region;

i) after having carried out step g), securing the first pipe part to said peripheral wall in the region of the peripheral-wall fastening-edge region by welding.

7. The method of claim 6, wherein: in step f) the first pipe part is inserted into the second pipe part, and in the course of step g) the first pipe part and the second pipe part are connected to one another by radial widening of at least the first pipe part at least in its longitudinal region overlapping with the second pipe part; or; in step f) the second pipe part is inserted into the first pipe part, and in step g) the first pipe part and the second pipe part are connected to one another by radial widening of at least the second pipe part at least in its longitudinal region overlapping with the first pipe part.

8. The method of claim 6, wherein in step a) the at least one muffler insert is provided so as to cause the at least one retaining wall to be connected, in each of two opposite end regions thereof, to a corresponding one of two partitions.

9. The method of claim 8, wherein each of the partitions connected to the at least one retaining wall has a partition opening provided therein; and wherein in step a) the at least one muffler insert is provided in such a manner that at least one second exhaust-gas routing pipe on each of the partitions connected to the at least one retaining wall engages in the partition opening provided therein and extends with a coupling portion beyond one of the partitions.

10. The method of claim 6, wherein in step e) the at least one muffler insert is surrounded by the peripheral wall by winding of a plate-like peripheral-wall blank around the at least one muffler insert; or, in step e) the at least one muffler insert is surrounded by providing the peripheral wall with a structure that is closed in the peripheral direction and by inserting the at least one muffler insert into the peripheral wall provided with a structure that is closed in the peripheral direction.

11. The method of claim 6, wherein a step h) is provided for securing an end wall to each of the axial end regions of the peripheral wall, elongated in the direction of a longitudinal axis (L) of the housing, by at least one of the following: material closure and positive closure.

12. The method of claim 11, wherein in step h) at least one of the end walls is secured to the peripheral wall in such a manner that an end-wall opening provided in this end wall is positioned in such a way that the coupling portion of a second exhaust-gas routing pipe is positioned so as to engage in the end-wall opening.

* * * * *